United States Patent
Jang et al.

(10) Patent No.: US 8,165,613 B2
(45) Date of Patent: Apr. 24, 2012

(54) METHOD AND APPARATUS FOR TRANSMITTING DATA USING INFORMATION ON COMMUNICATION ENVIRONMENT

(75) Inventors: Jeong-Rok Jang, Suwon-si (KR);
Soo-Hong Park, Gwangju-si (KR);
Min-Ho Lee, Gwacheon-si (KR);
Han-Sung Kim, Seongnam-si (KR);
Cheol-Ju Hwang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 565 days.

(21) Appl. No.: 12/438,245

(22) PCT Filed: Aug. 7, 2007

(86) PCT No.: PCT/KR2007/003783
§ 371 (c)(1),
(2), (4) Date: Feb. 20, 2009

(87) PCT Pub. No.: WO2008/023891
PCT Pub. Date: Feb. 28, 2008

(65) Prior Publication Data
US 2010/0178949 A1 Jul. 15, 2010

(30) Foreign Application Priority Data
Aug. 21, 2006 (KR) .................. 10-2006-0078981

(51) Int. Cl.
*H04B 7/00* (2006.01)
(52) U.S. Cl. ...................... 455/500; 455/63.1
(58) Field of Classification Search ............ 455/500, 455/63.1, 67.11, 67.13; 370/235, 282
See application file for complete search history.

(56) References Cited

U.S. PATENT DOCUMENTS

| | | | |
|---|---|---|---|
| 6,988,133 B1 | 1/2006 | Zavalkovsky et al. | |
| 7,185,112 B1* | 2/2007 | Kuranari et al. | 709/249 |
| 7,508,778 B2* | 3/2009 | Yafuso | 370/282 |
| 7,609,637 B2* | 10/2009 | Doshi et al. | 370/235 |
| 7,675,916 B2* | 3/2010 | Kempe | 370/395.21 |
| 2003/0163558 A1 | 8/2003 | Cao et al. | |

FOREIGN PATENT DOCUMENTS

| | | |
|---|---|---|
| JP | 2003-046529 A | 2/2003 |
| JP | 2006-005833 A | 1/2006 |
| KR | 10-1998-069474 A | 5/1998 |
| KR | 10-2005-0082499 A | 8/2005 |

OTHER PUBLICATIONS

Office Action dated Jun. 21, 2011 from the State Intellectual Property Office of P.R. China in counterpart Chinese application No. 200780030701.8.

* cited by examiner

*Primary Examiner* — Brian Young
(74) *Attorney, Agent, or Firm* — Sughrue Mion, PLLC

(57) ABSTRACT

Provided is data transmission method and apparatus. A method for transmitting data from a first device to a second device includes detecting information on a communication environment of the first device; receiving information on a communication environment of the second device from the second device; and adjusting the QoS of the data transmission in an application layer based on at least one of the information on the communication environment of the first device and the information on the communication environment of the second device. Accordingly, when a sender transmits data to a receiver, the QoS of data transmission can be adjusted by considering communication environments of the sender and the receiver, and thus optimized data transmission can be achieved.

17 Claims, 4 Drawing Sheets

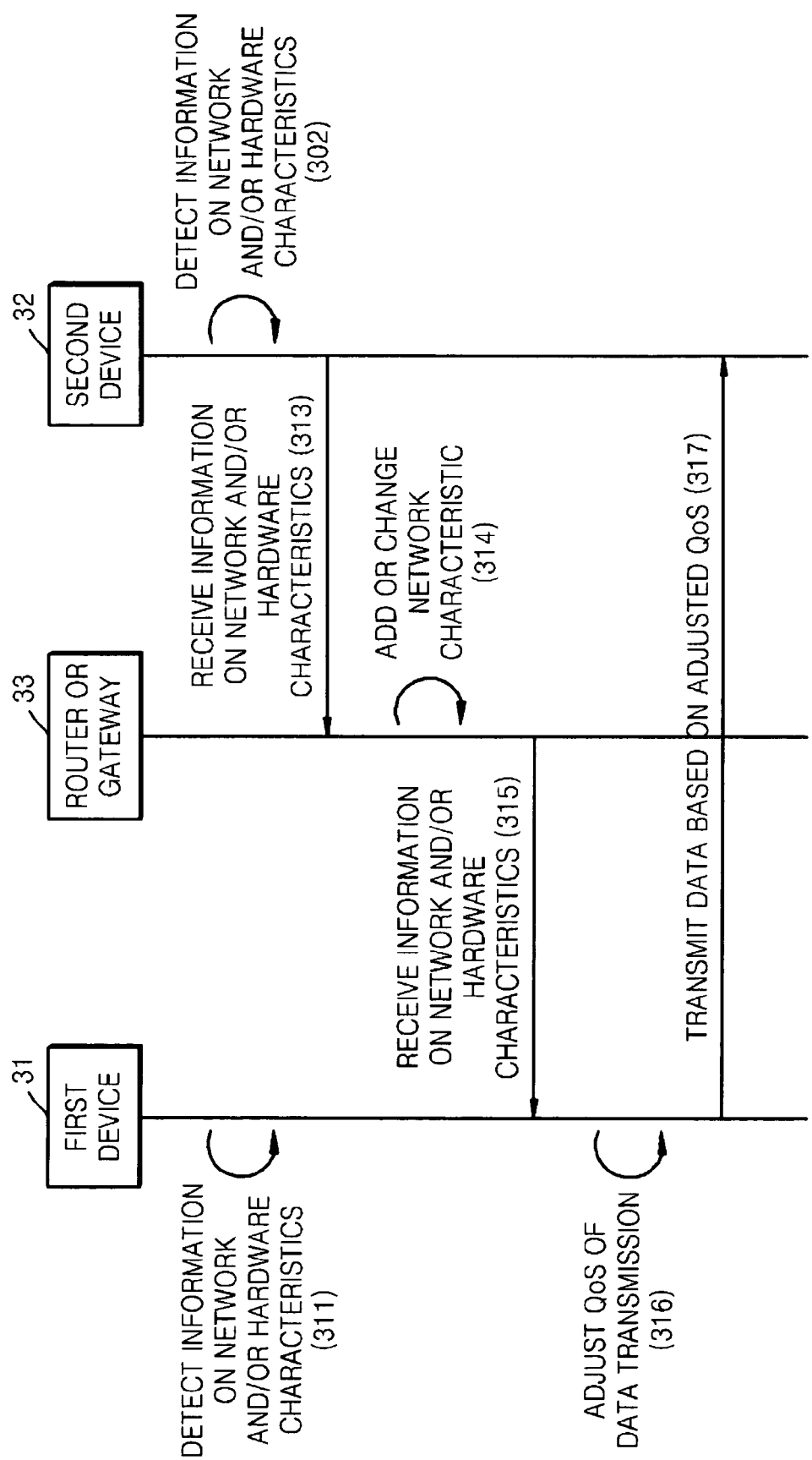

METHOD AND APPARATUS FOR TRANSMITTING DATA USING INFORMATION ON COMMUNICATION ENVIRONMENT

CROSS-REFERENCE TO RELATED PATENT APPLICATION

This application is a National Stage of International Application No. PCT/KR2007/003783 filed Aug. 7, 2007, and claims the benefit of Korean Patent Application No. 10-2006-0078981 filed on Aug. 21, 2006, in the Korean Intellectual Property Office, the disclosures of which are incorporated herein in their entirety by reference.

BACKGROUND OF THE INVENTION

1. Field of the Invention

Methods and apparatuses consistent with the present invention relate to a data transmission, and more particularly, to a data transmission method and apparatus in a communication environment in which network and/or hardware characteristics are changed.

2. Description of the Related Art

Accompanying the development of communication technology, various kinds of wired/wireless communication services and associated communication standards, which support multimedia communication, exist. In particular, increases in data rates have resulted in an increase of real-time audio and video streaming services through wired/wireless communication. For real-time streaming services, a technique enabling a user to listen to the music or view video in a seamless manner is most important. In particular, when a communication environment is changed, the importance of a data transmission method for seamless communication between a sender and a receiver is emphasized.

FIG. 1 illustrates a case of data communication in which a communication environment is degraded during data transmission.

In FIG. 1, it is assumed that a mobile terminal of a receiver 11 moves from a Wireless Local Area Network (WLAN) network 130 having a maximum data rate of 2 Mbps to a Wideband Code Division Multiple Access (WCDMA) network 140 having a maximum data rate of 384 Kbps. A sender 12 in a 2 Mbps wireless communication network is transmitting data to the mobile terminal of the receiver 11 at a data rate of 1 Mbps in operation 101 and does not know the characteristics of a network to which the mobile terminal of the receiver 11 moves. Thus, if the sender 12 continuously transmits data to the mobile terminal of the receiver 11 at the same data rate in operation 103 after handover of the mobile terminal of the receiver 11 is accomplished in operation 102, the mobile terminal of the receiver 11 cannot receive all data transmitted by the sender 12. That is, a data loss occurs. Thus, if the data being transmitted is streaming data, such as music or video, the receiver 11 cannot seamlessly listen to the music or view the video in real-time.

FIG. 2 illustrates a case of data communication in which a communication environment is improved during data transmission.

In FIG. 2, it is assumed that a mobile terminal of a receiver 21 moves from a WCDMA network 230 having a maximum data rate of 384 Kbps to a WLAN network 240 having a maximum data rate of 2 Mbps. A sender 22 is transmitting data to the receiver 21 at a data rate of 384 Kbps in operation 201 before handover of the mobile terminal of the receiver 21 and does not know the characteristics of a network to which the mobile terminal of the receiver 21 moves. Thus, if the sender 22 continuously transmits data to the mobile terminal of the receiver 21 at the same data rate in operation 203 after the handover of the mobile terminal of the receiver 21 is accomplished in operation 202, data transmission is inefficient since the data is transmitted at the data rate of 384 Kbps in the WLAN network 240 having the data rate of maximum 2 Mbps.

Data loss or inefficiency of data transmission may occur in a case of not only the handover between heterogeneous networks illustrated in FIGS. 1 and 2 but also handover between homogeneous networks. In addition, when network characteristics of the same network is changed without a handover, data loss or inefficiency of data transmission may also occur.

Besides the network characteristic information, hardware characteristic information of a sender and/or a receiver may also affect data communication. If the sender continuously transmits data without considering that a mobile terminal of the receiver cannot process data due to a change in an available resource of hardware such as Central Processing Unit (CPU) or memory, the mobile terminal of the receiver cannot receive the data normally.

SUMMARY OF THE INVENTION

Exemplary embodiments of the present invention provides a data transmission method and apparatus for guaranteeing Quality of Service (QoS) of data regardless of a change in a communication environment, which can occur during data transmission. The present invention also provides a computer readable recording medium storing a computer readable program for executing the method.

According to an aspect of the present invention, there is provided a method for transmitting data from a first device to a second device, the method comprising detecting information on a communication environment of the first device; receiving information on a communication environment of the second device from the second device; and adjusting the QoS of the data transmission in an application layer based on at least one of the information on the communication environment of the first device and the information on the communication environment of the second device.

The data may be scalable coded audio or video data.

The adjusting of the QoS may comprise adjusting scalability of the audio or video data based on at least one of the information on the communication environment of the first device and the information on the communication environment of the second device.

According to an aspect of the present invention, there is provided an apparatus for transmitting data of a first device to a second device, the apparatus comprising a characteristic information detector detecting information on a communication environment of the first device; a characteristic information receiver receiving information on a communication environment of the second device from the second device; a determiner determining based on at least one of the information on the communication environment of the first device and the information on the communication environment of the second device, which are provided by the characteristic information receiver, whether adjustment of the QoS of the data transmission is necessary; and a QoS adjuster adjusting the QoS of the data transmission in an application layer according to the determination result of the determiner.

The data may be scalable coded audio or video data.

Scalability of the audio or video data may be adjusted.

According to another aspect of the present invention, there is provided a computer readable recording medium storing a computer readable program for executing the method.

The present invention provides a data transmission method and apparatus for guaranteeing Quality of Service (QoS) of data regardless of a change in a communication environment, which can occur during data transmission. The present invention also provides a computer readable recording medium storing a computer readable program for executing the method.

As described above, according to the present invention, when a sender transmits data to a receiver, the QoS of data transmission can be adjusted by considering communication environments of the sender and the receiver, and thus stable data transmission can be achieved.

The sender can reduce hardware resources required for the data transmission by adjusting scalability of data to be transmitted and a data rate based on information on network and/or hardware characteristics. In addition, the receiver can be guaranteed QoS by receiving the data optimized and transmitted according to the network and/or hardware characteristic information.

BRIEF DESCRIPTION OF THE DRAWINGS

The above and other features and aspects of the present invention will become more apparent by describing in detail exemplary embodiments thereof with reference to the attached drawings in which:

FIG. 3B is a flowchart illustrating a data transmission method according to another embodiment of the present invention.

DETAILED DESCRIPTION OF THE INVENTION

Figure 3A:
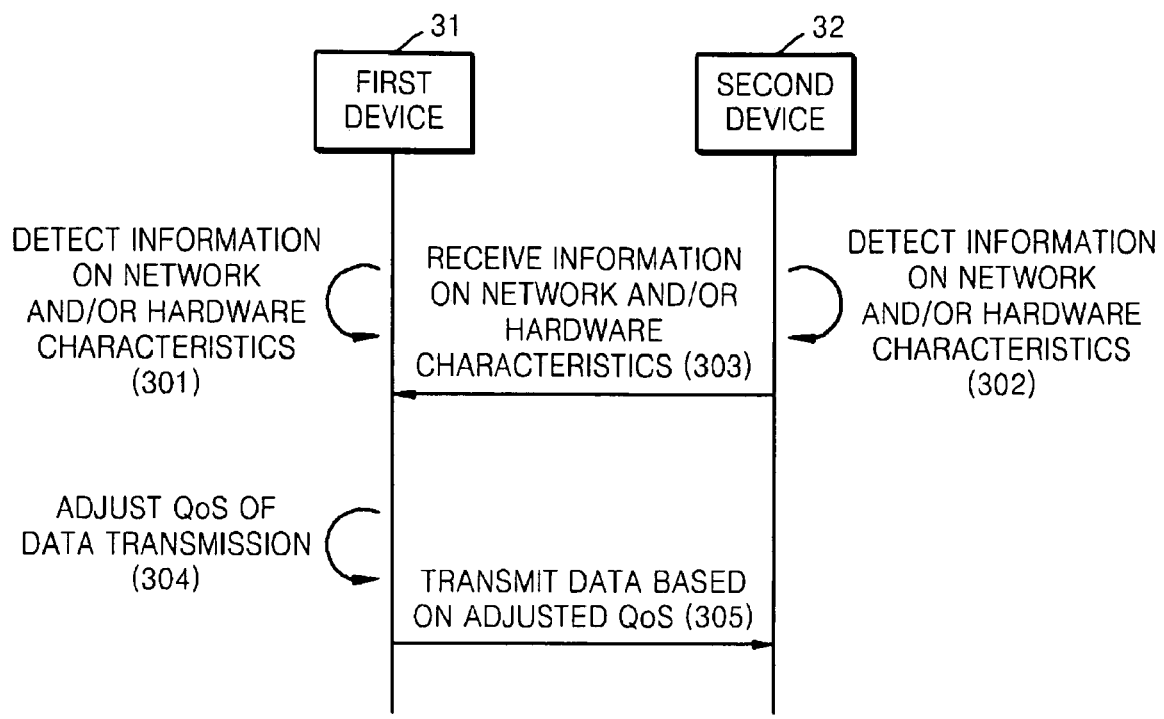
FIG. 3A is a flowchart illustrating a data transmission method according to an embodiment of the present invention.

FIG. 3A is a flowchart illustrating a data transmission method according to an embodiment of the present invention.

In FIG. 3A, a first device 31 is a sender transmitting data, and a second device 32 is a receiver receiving the data transmitted by the first device 31. FIG. 3A illustrates a case where a communication environment of the first device 31 and/or the second device 32 is changed while the first device 31 is transmitting data to the second device 32. Information on the communication environment includes information on network and/or characteristics of hardware used for the data communication.

The network characteristic information includes information on a kind of network used for the data communication of the first device 31 or the second device 32 and information on a bandwidth available in the network. A change in the network characteristic information may occur when the first device 31 and/or the second device 32 performs a handover to a heterogeneous/homogeneous network.

Figure 1:
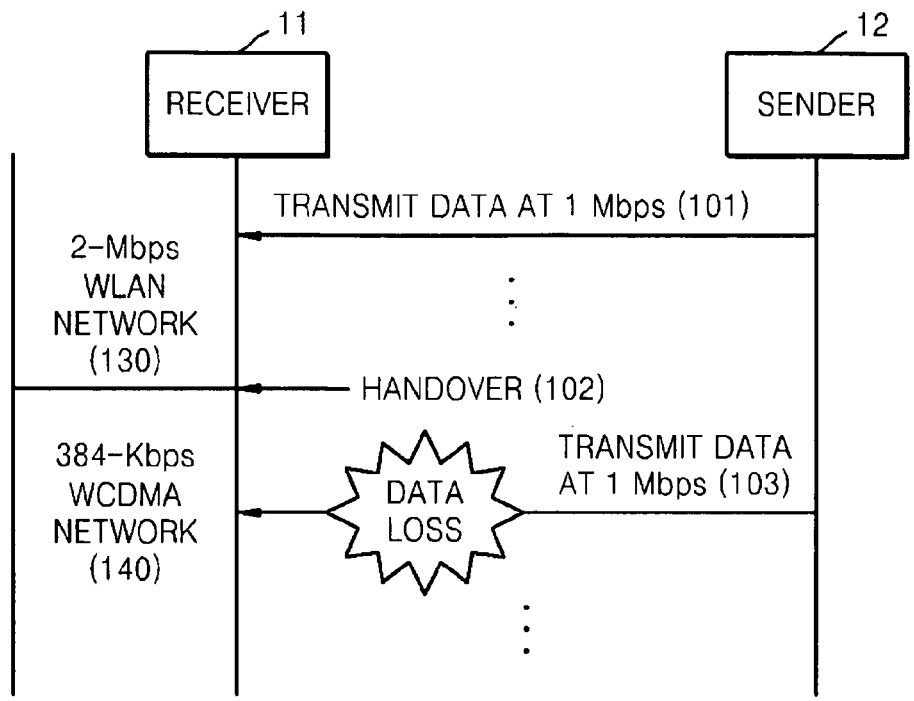
FIG. 1 illustrates a case of data communication in which a communication environment is degraded during data transmission.
Figure 2:
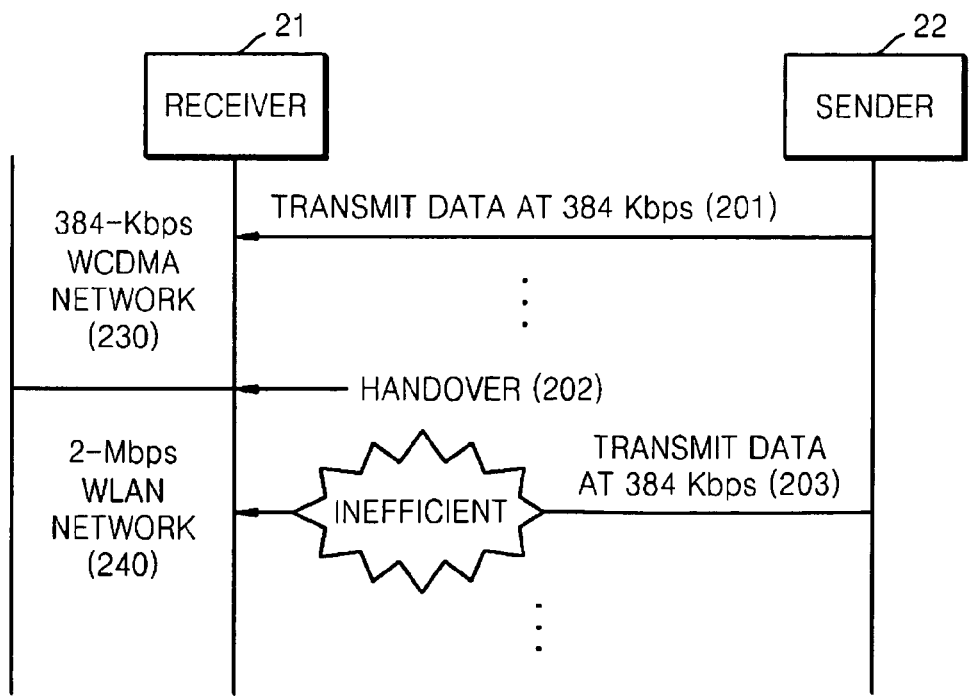
FIG. 2 illustrates a case of data communication in which a communication environment is improved during data transmission.

As illustrated in FIGS. 1 and 2, if a sender does not know that a receiver performs a handover to a heterogeneous network, a loss of data being transmitted or inefficiency of data transmission may occur. Even when the receiver performs a handover to a homogeneous network, a difference may exist in the number of users or a bit error rate (BER) of a network after handover, resulting in a change in a network characteristic.

The network characteristic may be changed even in the same network without handover, and in this case, an increase or decrease of the number of users and an increase or decrease of BER in the same network are elements which can change the network characteristic.

A change in a hardware characteristic may also affect the data communication between the first device 31 and the second device 32. The hardware characteristic information includes information on hardware resources available in the first device 31 or the second device 32, i.e., information on a CPU speed and a memory size. For example, if an available CPU or memory resource of the second device 32 for data reception is decreased due to another task besides the data reception, the second device 32 may not receive data transmitted by the first device 31.

A case where an available hardware resource of the first device 31 for data transmission is decreased may also affect the data communication. If a specific amount of the data transmitted by the first device 31 must be transmitted to the second device 32 per unit of time, for example, if the data is streaming data, the first device 31 may not transmit the streaming data to the second device 32 in real-time due to a decrease in a CPU or memory resource available for the data transmission.

On the contrary, if an available hardware resource of the first device 31 or the second device 32 is increased, an increase of the QoS of data communication may be necessary. That is, QoS provided to the second device 32 can be increased by reducing the time taken for data transmission by increasing a data rate, or transmitting multimedia data having high image or sound quality.

The network characteristic information and the hardware characteristic information are only illustrations of communication environment information, and all kinds of information affecting QoS of data transmission between the first device 31 and the second device 32 can be included in the communication environment information.

Referring to FIG. 3A, in operation 301, the first device 31 detects information on its network and/or hardware characteristics.

The network characteristic information includes information on a kind of network and an available bandwidth used by the first device 31 for data communication. The hardware characteristic information includes information on hardware resources available in the first device 31 for the data communication, i.e., information on a CPU speed and a memory size.

The method of extracting the network and/or hardware characteristic information is not limited to a specific method. For example, information on a network characteristic currently used for data transmission can be extracted using a detection method such as Network Driver Interface Specification (NDIS) of Windows Operating System (OS).

In operation 302, the second device 32 detects information on its network and/or hardware characteristics.

That is, the second device 32 detects information on a network characteristic used to receive data transmitted by the first device 31 and/or information on a hardware characteristic of hardware available for the data reception. As in the case of the first device 31, a method of extracting the network and/or hardware characteristic information is not limited. For the network characteristic information, a detection method, such as NDIS of Windows OS, can be used.

Although operations 301 and 302 are respectively performed by the first device 31 and the second device 32, it will be understood by those of ordinary skill in the art that operations 301 and 302 can be performed at the same time or at different times in a different sequence.

In operation 303, the first device 31 receives the information on the network and/or hardware characteristics of the second device 32 from the second device 32.

That is, in order for the first device 31 to transmit in consideration of the information on the entire communication environment, the first device 31 receives the information on the network and/or hardware characteristics of the second device 32.

The network and/or hardware characteristic information can be received using a specifically defined communication protocol or received by expanding an existing communication protocol.

The network and/or hardware characteristic information can be periodically received with a predetermined time interval or received only if the network and/or hardware characteristic information of the second device 32 is changed.

In operation 304, the first device 31 adjusts the QoS of data transmission based on the network and/or hardware characteristic information of the first device 31, which has been detected in operation 301, and the network and/or hardware characteristic information of the second device 32, which has been received from the second device 32 in operation 303. The QoS adjustment is performed by an application used to adjust QoS of data transmission.

For example, a data rate is adjusted or data is changed. A change in data occurs when, for example, the scalability of scalable coded audio or video data is adjusted. If the network and/or hardware characteristic information indicates an improved communication environment, data can be transmitted to the second device 32 within a short time by increasing the data rate, or data having high sound or video quality can be transmitted to the second device 32 by adjusting the scalability.

Any method of adjusting QoS of data transmission, such as changing a period of data transmission or a transmission path, can be used in operation 304.

The adjustment of QoS can be performed only if the network and/or hardware characteristic information of the first device 31 or the second device 32 is changed or performed periodically with a constant time interval. If the network and/or hardware characteristic information of the second device 32 is periodically received in operation 303, the adjustment of the QoS of data transmission may be periodically performed.

In operation 305, the first device 31 transmits data to the second device 32 based on the QoS adjusted in operation 304.

FIG. 3B is a flowchart illustrating a data transmission method according to another embodiment of the present invention.

FIG. 3B illustrates a case where information on a network characteristic includes information on a characteristic that is added or changed in a network path between the first device 31 and the second device 32.

A network characteristic in a data transmission path also affects data communication between the first device 31 and the second device 32. This case corresponds to a case where a router or gateway 33 relaying data cannot process a sufficient amount of data. For example, this case corresponds to a case where a network to which the first device 31 and the second device 32 belong to supports a data rate of 100 Mbps while a data rate of the router or gateway 33 does not exceed 10 Mbps. It is assumed that the first device 31 transmits data at a data rate of 10 Mbps regardless of the network environments of the first device 31 and the second device 32. The router or gateway 33 is only an illustration illustrating how a network characteristic of a transmission path can be affected.

Operations 311 and 312 are the same as operations 301 and 302 illustrated in FIG. 3A. The first device 31 detects information on its network and/or hardware characteristics, and the second device 32 detects information on its network and/or hardware characteristics.

In operation 313, the second device 32 transmits the detected network and/or hardware characteristic information to the router or gateway 33.

In operation 314, the router or gateway 33 adds information on its network characteristic to the network and/or hardware characteristic information received from the second device 32 or changes the network and/or hardware characteristic information received from the second device 32.

For example, it is assumed that the network characteristic information of the second device 32 is 100 Mbps and the network characteristic information of the router or gateway 33 is 10 Mbps. The router or gateway 33 can change the network characteristic information received from the second device 32 to the network characteristic information of the router or gateway 33, i.e., 10 Mbps, and transmit the changed network characteristic information to the first device 31. Alternatively, the router or gateway 33 can add the network characteristic information of the router or gateway 33 to the network characteristic information received from the second device 32 and transmit the added network characteristic information to the first device 31. In this case, the first device 31 determines a network characteristic affecting data transmission, based on the network characteristic information of the router or gateway 33 and the network characteristic information of the second device 32.

In operation 315, the router or gateway 33 transmits the network and/or hardware characteristic information to the first device 31. Here, the network characteristic information is the information that is added or changed in operation 314.

Operations 316 and 317 are the same as operations 304 and 305 illustrated in FIG. 3A. The first device 31 adjusts the QoS of data transmission based on the received network and/or hardware characteristic information and transmits data to the second device 32 based on the adjusted QoS.

Figure 4:
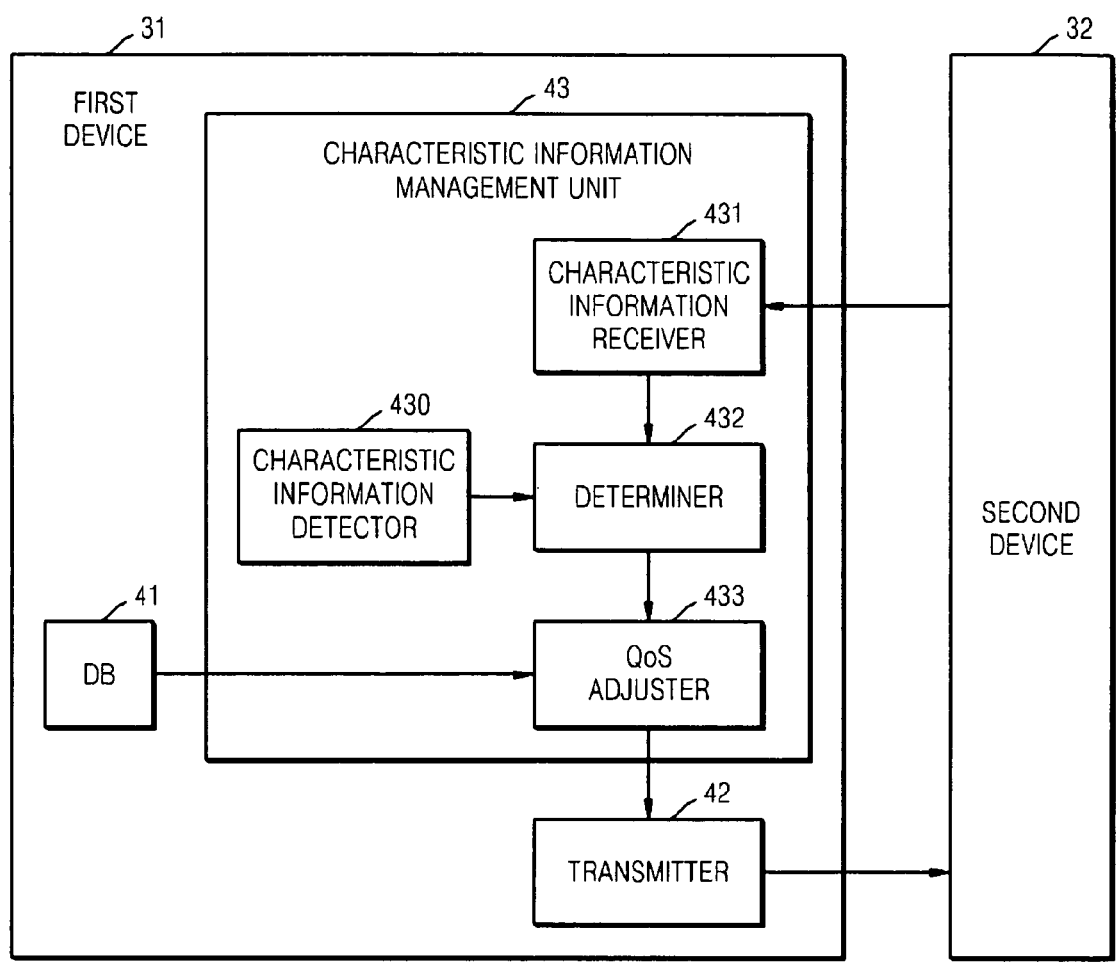
FIG. 4 is a block diagram of a data transmission apparatus according to an embodiment of the present invention.

FIG. 4 is a block diagram of a data transmission apparatus according to an embodiment of the present invention.

In FIG. 4, the first device 31 is a sender transmitting data, and the second device 32 is a receiver receiving the data transmitted by the first device 31.

FIG. 4 illustrates a data transmission apparatus of the first device 31 adjusting the QoS of data transmission considering a case where a communication environment of the first device 31 and/or the second device 32 is changed during the data transmission. Information on a network characteristic and information on a hardware characteristic are only illustrations of information on the communication environment, and all kinds of information affecting the QoS of data transmission between the first device 31 and the second device 32 can be included in the communication environment information.

Referring to FIG. 4, the data transmission apparatus includes a database 41, a transmitter 42, and a characteristic information management unit 43. The characteristic information management unit 43 includes a characteristic information detector 430, a characteristic information receiver 431, a determiner 432, and a QoS adjuster 433.

The database 41 is a storage unit storing data to be transmitted from the first device 31 to the second device 32.

The characteristic information detector 430 detects information on network and/or hardware characteristics of the first device 31. That is, the characteristic information detector 430 detects information on network and/or hardware characteristics, which can be used by the first device 31 for data communication with the second device 32.

The characteristic information receiver 431 receives information on network and/or hardware characteristics of the second device 32 from the second device 32. The characteristic information receiver 431 also receives information on a network characteristic that is added or changed by the router or gateway 33 besides the network and/or hardware characteristic information of the second device 32.

As described above, the network and/or hardware characteristic information may be received as a kind of general data using an existing communication protocol between the first device 31 and the second device 32 without using the specifically defined or expanded communication protocol.

The determiner 432 determines whether adjustment of the QoS of the data transmission is necessary, based on the network and/or hardware characteristic information of the first device 31, which has been detected by the characteristic information detector 430, and the network and/or hardware characteristic information of the second device 32, which has been received by the characteristic information receiver 431. That is, whether adjustment of the QoS of the data transmission is necessary is determined by determining whether a communication state is degraded or improved.

The QoS adjuster 433 adjusts the QoS of the data transmission by receiving data from the database 41 if the determiner 432 determines that adjustment of the QoS of the data transmission is necessary.

For example, a data rate is adjusted or data is changed. A change in data occurs when, for example, the scalability of scalable coded audio or video data is adjusted. The adjustment of QoS is performed in an application layer using an application for adjusting the QoS of data transmission.

The transmitter 42 transmits the data whose QoS has been adjusted by the QoS adjuster 433 to the second device 32.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. In other exemplary embodiments, the computer readable recording medium may include carrier waves (such as data transmission through the Internet). In yet other exemplary embodiments, computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. A method used by a first device for transmitting data to a second device, the method comprising:
    detecting information on a communication environment of the first device which comprises at least one of a first central processing unit (CPU) speed and a first memory size, of the first device;
    receiving information on a communication environment of the second device from the second device which comprises at least one of a second central processing unit (CPU) speed and a second memory size, of the second device; and
    adjusting Quality of Service (QoS) of the data transmission in an application layer based on at least one of the information on the communication environment of the first device and the information on the communication environment of the second device.

2. The method of claim 1, wherein the information on the communication environment of the first device further comprises information on a first network of the first device, used for first data transmission, and
    the information on the communication environment of the second device further comprises information on a second network of the second device, used for second data transmission.

3. The method of claim 2, wherein the information on the first network comprises information on a data rate of the first network and the information on the second network comprises information on a data rate of the second network.

4. The method of claim 2, wherein the information on the first network comprises information on a network path between the first device and the second device.

5. The method of claim 1, wherein the data is scalable coded audio data or scalable coded video data.

6. The method of claim 5, wherein the adjusting of the QoS comprises adjusting scalability of the coded audio or the coded video data based on at least one of the information on the communication environment of the first device and the information on the communication environment of the second device.

7. The method of claim 1, wherein the adjusting of the QoS comprises periodically adjusting the QoS of the data transmission in an application layer based on at least one of the information on the communication environment of the first device and the information on the communication environment of the second device.

8. An apparatus for transmitting data of a first device to a second device, the apparatus comprising:
    a characteristic information detector which detects information on a communication environment of the first device which comprises at least one of a first central processing unit (CPU) speed and a first memory size, of the first device;
    a characteristic information receiver which receives information on a communication environment of the second device from the second device which comprises at least one of a second central processing unit (CPU) speed and a second memory size, of the second device;
    a determiner which determines based on at least one of the information on the communication environment of the first device and the information on the communication environment of the second device, which are provided by the characteristic information receiver, whether adjustment of the QoS of the data transmission is necessary; and
    a QoS adjuster which adjusts the QoS of the data transmission in an application layer according to a determination result of the determiner.

9. The apparatus of claim 8, wherein information on the communication environment of the first device further comprises information on first network of the first device, used for first data transmission, and the information on the communication environment of the second device further comprises information on a second network of the second device, used for second data transmission.

10. The apparatus of claim 9, wherein the information on the first network comprises information on a data rate of the first network and the information on the second network comprises information on a data rate of the second network.

11. The apparatus of claim 9, wherein the information on the first network comprises information on a network path between the first device and the second device.

12. The apparatus of claim 8, wherein the data is scalable coded audio or scalable coded video data.

13. The apparatus of claim 12, wherein the QoS adjuster adjusts scalability of the coded audio or the coded video data.

14. The apparatus of claim 8, wherein the QoS adjuster periodically adjusts the QoS of the data transmission.

15. A computer readable recording medium storing a computer readable program for executing the method used by a first device for transmitting data to a second device, the method comprising:

detecting information on a communication environment of the first device which comprises at least one of a first central processing unit (CPU) speed and a first memory size, of the first device;

receiving information on a communication environment of the second device from the second device which comprises at least one of a second central processing unit (CPU) speed and a second memory size, of the second device; and adjusting Quality of Service (QoS) of the data transmission in an application layer based on at least one of the information on the communication environment of the first device and the information on the communication environment of the second device.

16. The method of claim 1, wherein the information on the communication environment of the first device further comprises a first data rate of a first network of the first device, the information on the communication environment of the second device further comprises a second data rate of a second network of the second device, and the adjusting the QoS comprises adjusting the QoS of the data transmission based on at least one of the first data rate of the first network and the second data rate of the second network.

17. The method of claim 16, wherein the adjusting the QoS comprises adjusting the QoS of the data transmission based on the first data rate and the second data rate, the first data rate is being different from the second data rate.

* * * * *